United States Patent
Soundrapandian

(10) Patent No.: US 8,442,494 B2
(45) Date of Patent: May 14, 2013

(54) SYSTEM FOR UPDATING PRESENTATIONS ON MOBILE DEVICES AND METHODS THEREOF

(75) Inventor: Suriyaprakash Soundrapandian, Chandler, AZ (US)

(73) Assignee: Mitel Networks Corporation, Ottawa Ontario (CA)

( * ) Notice: Subject to any disclaimer, the term of this patent is extended or adjusted under 35 U.S.C. 154(b) by 0 days.

(21) Appl. No.: 12/932,203

(22) Filed: Feb. 18, 2011

(65) Prior Publication Data

US 2012/0214446 A1    Aug. 23, 2012

(51) Int. Cl.
*H04L 12/58* (2006.01)

(52) U.S. Cl.
USPC ......... 455/412.1; 345/636; 345/557; 345/555

(58) Field of Classification Search ............... 455/412.1, 455/3.01, 566; 345/636, 557, 555
See application file for complete search history.

(56) References Cited

U.S. PATENT DOCUMENTS

| | | | |
|---|---|---|---|
| 6,973,457 B1 | 12/2005 | Bastawala et al. | |
| 2005/0250548 A1* | 11/2005 | White | 455/566 |
| 2008/0108299 A1* | 5/2008 | Hullot et al. | 455/3.01 |
| 2009/0103810 A1* | 4/2009 | Echigo et al. | 382/190 |
| 2009/0132956 A1 | 5/2009 | Mahasintunan | |
| 2010/0010965 A1 | 1/2010 | Edlund et al. | |

FOREIGN PATENT DOCUMENTS

| | | |
|---|---|---|
| CN | 101431556 A * | 5/2009 |
| EP | 0993165 A1 | 4/2000 |
| EP | 1718088 A1 | 11/2006 |
| EP | 2124413 A1 | 11/2009 |
| WO | WO 2009/052033 A2 | 4/2009 |

* cited by examiner

*Primary Examiner* — David Q Nguyen

(57) ABSTRACT

When a user interface is scrolled, data requests are made. If the data is not found in cache, the data is retrieved from a remote server by asynchronously placing data requests to a server starting with the last added data request. Through a relaxed loader, the mobile device does not bombard the remote server with requests. By removing older data requests, the mobile application fetches data more in line with the current display. After receiving the data from the remote server, the data is decoded and compressed. The data is placed within cache. When multiple entries exist, the data within cache is associated and processed. Instead of the interface decoding data from the cache for each entry, the processed data is provided to the interface removing processing and required memory for each entry.

12 Claims, 8 Drawing Sheets

SYSTEM FOR UPDATING PRESENTATIONS ON MOBILE DEVICES AND METHODS THEREOF

TECHNICAL FIELD

This application generally relates to a mobile device, and more particularly, to mobile device applications that request data in real-time, for example, scrolling presentation screens that display contacts, call history and messages.

BACKGROUND

Applications residing on mobile platforms pose different challenges when fetching data in real-time from remote servers. For example, the total memory for most mobile devices is five hundred and twelve megabytes. Out of this memory, each program has thirty-two megabytes of memory in which to run. The thirty-two megabytes of memory is the entirety of the memory that a program can be utilizing at any one point. Because memory available on mobile devices is limited, caching all data from a remote server in its native format is not always feasible.

Users also tend to require views consisting of vast amounts of information on a single screen, for example, an entire corporate contact lists in a single view. These views apply scrolling and expect a very smooth transition. When the items in the view require specific individual data, such as real-time data or large images stored on a server, a single scroll on the screen would result in tremendous amount of requests to the server. Accordingly, this would slow down the processing on the device itself making the device perform inadequately and resulting in a very poor user experience.

When memory resources are scarce, mobile applications do not show all of the data or in the alternative, the mobile applications create methods for on-demand only viewing of single items to prevent scrolling issues. To overcome the above-described challenges, a system for updating presentations on mobile devices and methods thereof are described in the present application. These as well as other related advantages are described below.

BRIEF DESCRIPTION OF DRAWINGS

The novel features believed to be characteristic of the application are set forth in the appended claims. In the descriptions that follow, like parts are marked throughout the specification and drawings with the same numerals, respectively. The drawing figures are not necessarily drawn to scale and certain figures can be shown in exaggerated or generalized form in the interest of clarity and conciseness. The application itself, however, as well as a preferred mode of use, further objectives and advantages thereof, will be best understood by reference to the following detailed description of illustrative embodiments when read in conjunction with the accompanying drawings, wherein:

DESCRIPTION OF THE APPLICATION

Figure 1:
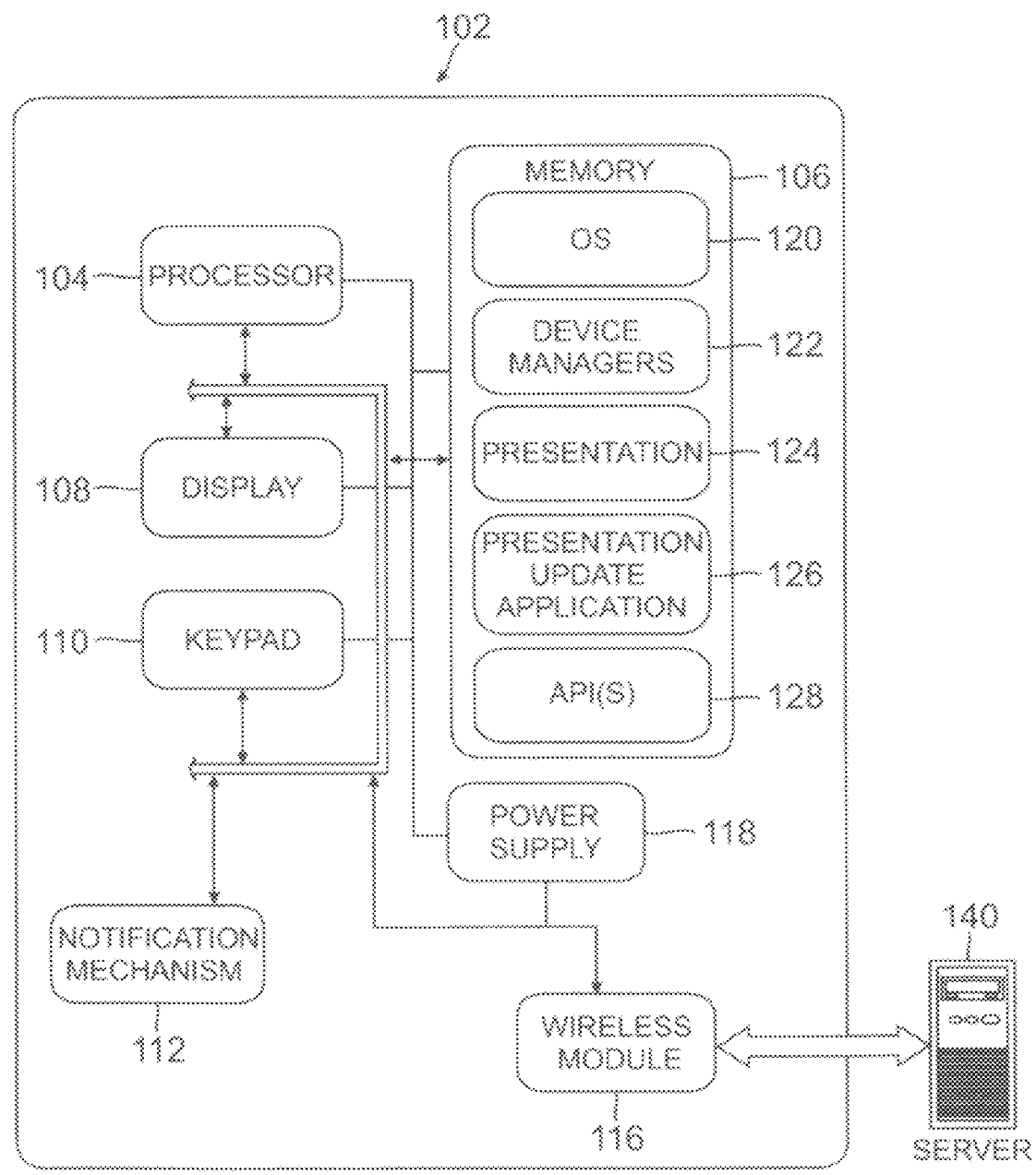
FIG. 1 depicts illustrative hardware and software components of a typical mobile device for providing rapid updates to a presentation in accordance with one aspect of the present application.

The description set forth below in connection with the appended drawings is intended as a description of presently preferred embodiments of the application and is not intended to represent the only forms in which the present application can be constructed and/or utilized. The description sets forth the functions and the sequence of steps for constructing and operating the application in connection with the illustrated embodiments. It is to be understood, however, that the same or equivalent functions and sequences can be accomplished by different embodiments that are also intended to be encompassed within the spirit and scope of this application.

Generally described, the present application relates to a mobile device, and more specifically, to retrieving data from a remote server on request without affecting performance of the mobile device. The system described herein can be typically applied to native mobile device applications in which real-time data from a remote server can be used for interface updates. These applications can include, but are not limited to, scrolling presentation screens related to such items as contacts, call history, messages, etc. In an illustrative embodiment, when the user interface is scrolled, one or more data requests can be made. When the data is not found in cache, the data can be retrieved through a relaxed loader from a remote server by asynchronously placing data requests to the remote server starting with the last added data request. The relaxed loader allows the mobile device to not bombard the remote server with requests. By removing older data requests, the mobile applications can fetch data more in line with the current display.

After receiving the data from the remote server, the data can be decoded and compressed. The data can then be placed within cache. In the illustrative embodiment, the data within the cache can be associated and processed for use with multiple entries. For example, in the case of a call history presentation, there can be multiple entries for the same person within the presentation. Instead of the presentation decoding the data from cache for each entry and the presentation processing that data for the entry, the data can be processed within the cache into a form useable for multiple entries within the presentation before being provided to the presentation.

Numerous advantages can be provided through the mobile device as illustrated above. The device can provide data on the interface dynamically and in real-time. Furthermore, through procedures described below, the mobile device can relax the burden of processing data, for example, when three thousand images are requested. This approach can be extended to other types of data and subscriptions for data to the remote server based on view. For example, if the user listing is to show telephony presence, then the same components can be used to subscribe for data instead of fetching data from the remote server. Furthermore, because of the compressor, more data can be placed within cache, for example, a five kilobyte image from the server of a 120×120 pixel can be stored in cache using six hundred bytes when the image in cache is encoded with a 32×32 pixel.

Typically, the system and methods use limited memory without affecting the user experience. It attempts to solve previously existing issues by fetching and retrieving data using different techniques as opposed to limiting a user's view. As referred to in the present application, data can refer to images, messages or any other type of information. Furthermore, the term user interface can be interchanged with the term presentation. Many additional features and elements of the present application will become apparent to those of ordinary skill in the relevant art as provided for in the following description.

Figure 5:
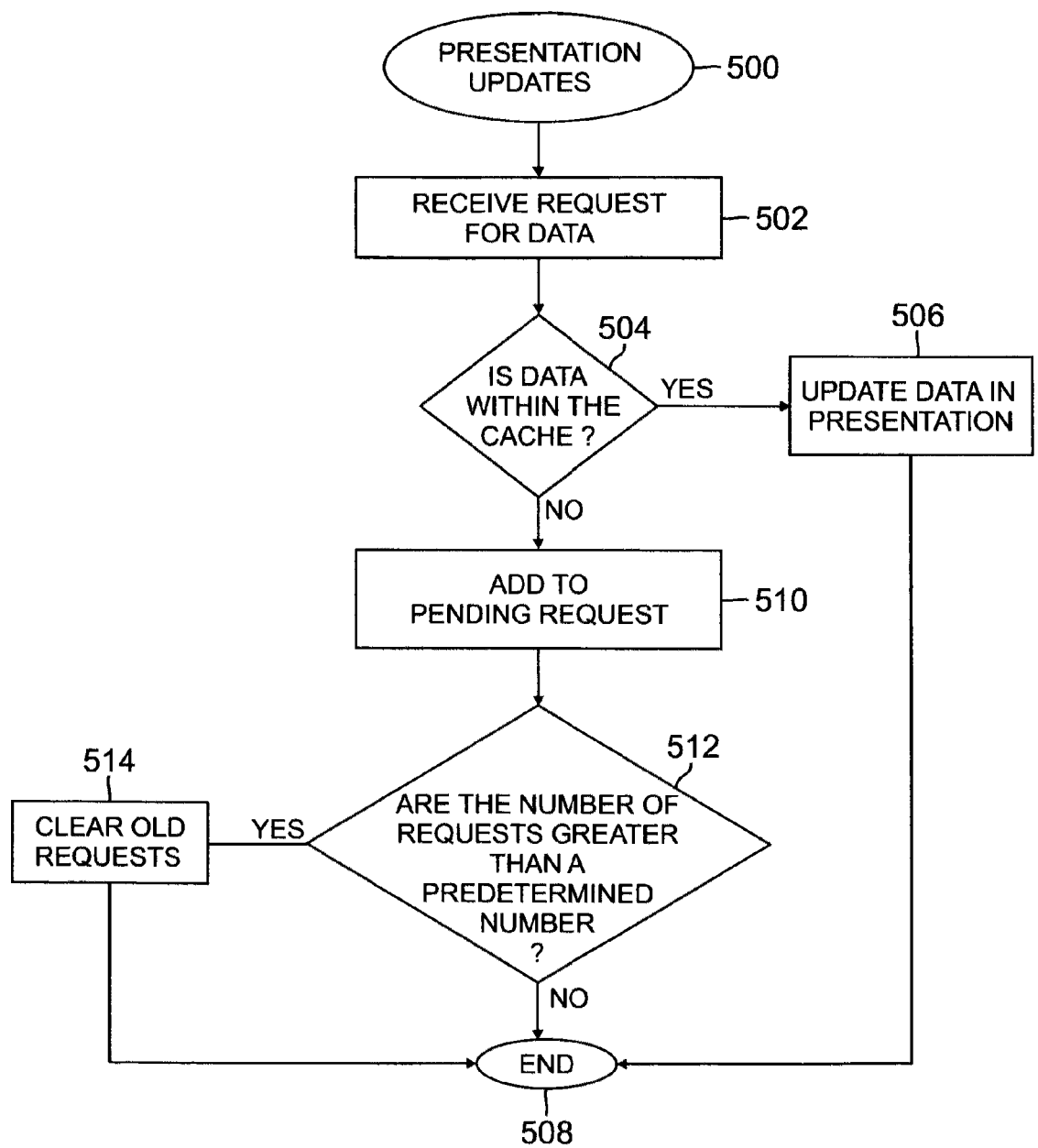
FIG. 5 is a flow chart showing exemplary routines for handling data requests in accordance with one aspect of the present application.
Figure 6:
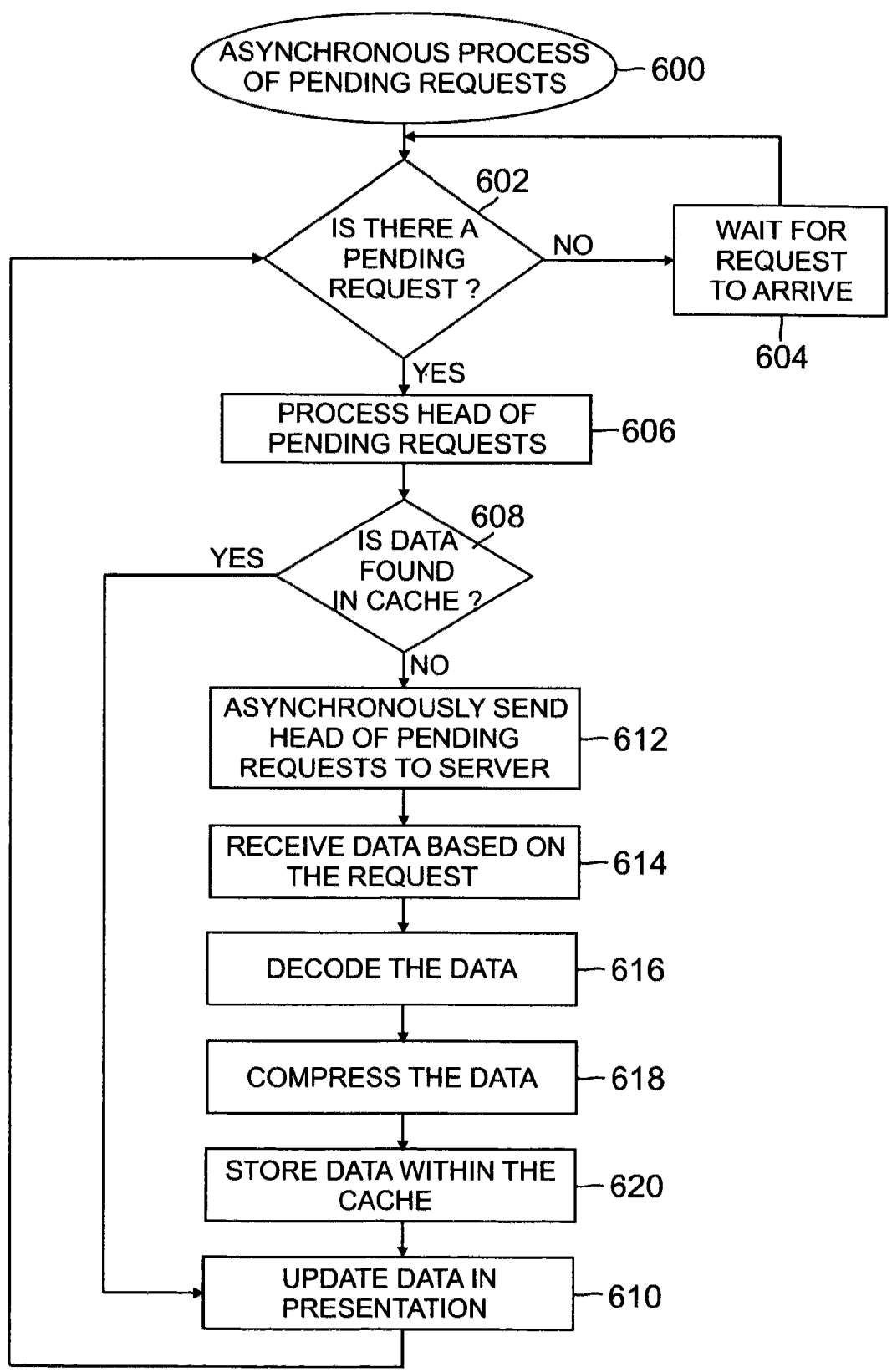
FIG. 6 provides a flow chart showing exemplary routines for processing pending requests in accordance with one aspect of the present application.
Figure 7:
FIG. 7 depicts an exemplary presentation displaying missed calls from a number of callers in accordance with one aspect of the present application.
Figure 8:
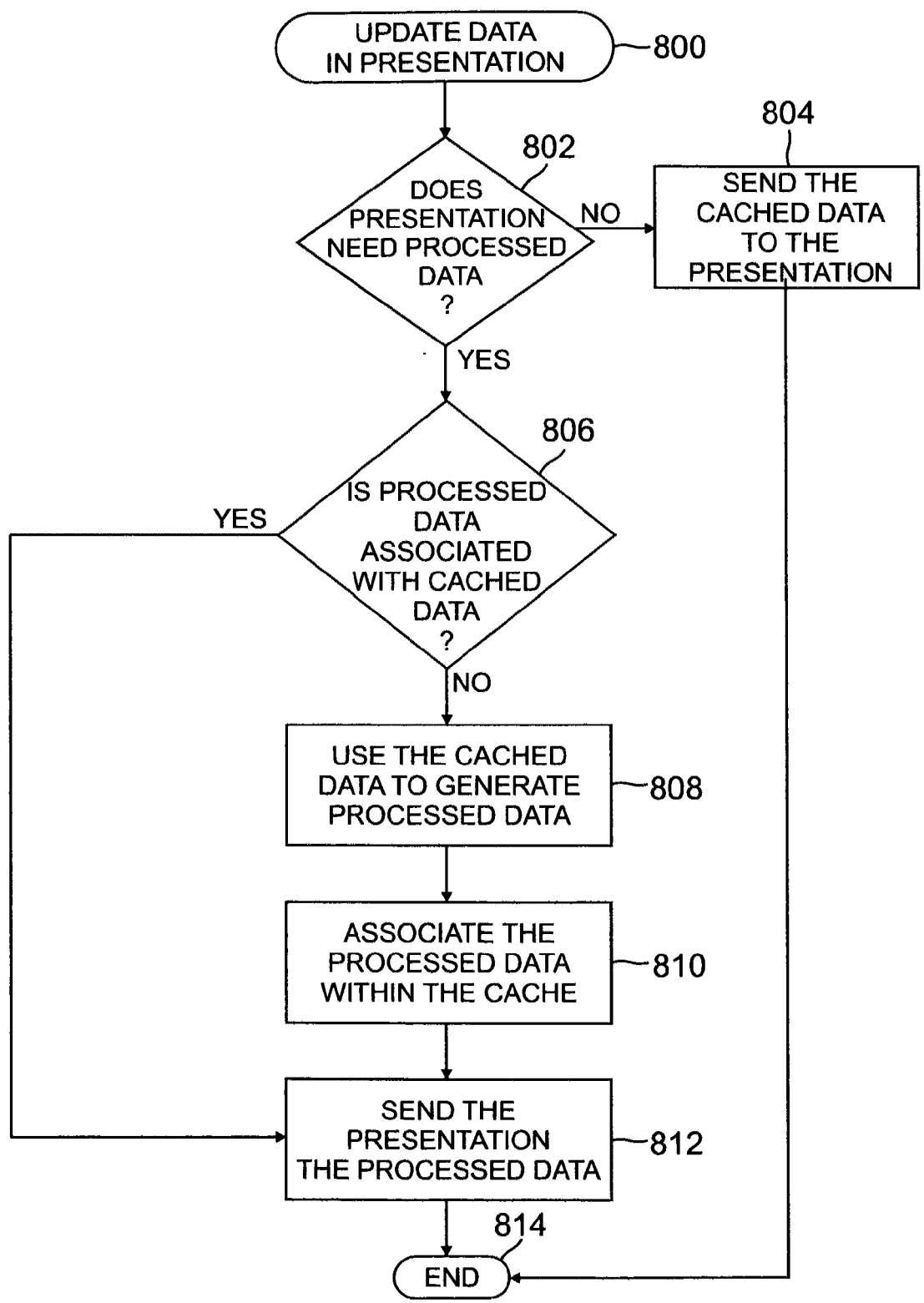
FIG. 8 is an illustrative flowchart showing processes for updating data within the presentation in accordance with one aspect of the present application.

Before describing embodiments of the present application, an exemplary mobile device will be described in FIG. 1 along with several screen shots showing scrolling presentations in FIGS. 2A, 2B, 3A and 3B. Components within the system will be described thereafter in FIG. 4. FIGS. 5 and 6 provide exemplary routines within flow charts for retrieving data for the presentation on the mobile device. FIGS. 7 and 8 show processes for handling multiple entries within a presentation.

While the present application is used in mobile devices, other apparatuses or systems can be used that are not mobile, for example, IP phones or desktop stations having limited memory. Turning now to FIG. 1, illustrative hardware and software components of a typical mobile device 102 for providing rapid updates to a presentation 124 in accordance with one aspect of the present application is provided. In typical embodiments, the mobile device 102 can have a processor 104 for implementing logic, a memory 106, a display 108 and a keypad 110. The display 108 of the mobile device 102 can be a liquid crystal display (LCD), or any other type of display commonly used in mobile devices 102. The display 108 can be touch-sensitive, and can act as an input device. The keypad 110 can be a push button numeric dialing pad (such as on a typical telephone), a multi-key keyboard (such as a conventional keyboard), or any other device for inputting textual data.

The memory 106 generally includes both volatile memory (e.g., RAM) and non-volatile memory (e.g., ROM, Flash Memory, or the like). The non-volatile portion of the memory 106 can be used to store persistent information which should not be lost when the mobile device 102 is powered down. The mobile device 102 can include an operating system (OS) 120, such as Windows CE® or Windows Mobile® available from Microsoft Corporation, Android™ from Google, or other OS. The OS can reside in the memory 106 and be executed on the processor 104.

The memory 106 can also include one or more device managers 122 for interacting with one or more I/O devices. The device managers 122 can be software installed on the mobile device 102. A device manager 122 can correspond to each I/O device. In addition to the device manager 122, one or more presentations 124 can be loaded into memory 106 and run on or in association with the operating system 120. The presentations 124 can come in a variety of forms, but for purposes of illustration will be described herein as scrolling presentations. Also within the memory 106, a presentation update application 126 can be run on the mobile device 102 in association with the presentations 124.

In operation, presentations 124 running through the presentation update application 126 can retrieve data from a server 140 on request without affecting the interface. While shown as software, the presentation update application 126 can be run on hardware, software or combination of hardware and software. In one embodiment, the presentation update application 126 can operate outside memory 106. As will be shown below, the application 126 can be applied to scrolling presentation screens related to such items as contacts, call history, messages, etc.

The memory 106 can also include a collection of one or more APIs 128 for facilitating wireless communication between the mobile device 102 and one or more remote I/O devices. The APIs 128 can be invoked by the presentations 124 and presentation update application 126 to recognize and control the one or more remote I/O devices. In this manner, the mobile device 102 is able to take advantage of services or functionalities of the one or more remote I/O devices.

The mobile device 102 can also include a power supply 118, which can be implemented as one or more batteries, fuel cells, or other sources of electrical power. The power supply 118 might further include an external power source, such as an AC adapter or a powered docking cradle that supplements or recharges the batteries. The mobile device 102 can include one or more audio, visual, and/or vibratory notification mechanisms 112. The mobile device 102 can also include a wireless module 116, such as a WiFi module that facilitates wireless connectivity between the mobile device 102 and the server 140.

Represented as connected directly to the relaxed loader 402, the server 140 can be reached over a network. The network can include a local area network, wide area network, personal area network, campus area network, metropolitan area network, or global area network. Such networking environments are commonplace in office networks, enterprise-wide computer networks, intranets and the Internet, which are all types of networks. The server 140, within the present application, can handle data requests and provide data 212 back to the source of the data requests. The server 140 can include one or many computers and is not limited to a single entity.

The technology described herein can be implemented as logical operations and/or modules in the mobile device 102, and more particularly, the memory 106. The logical operations can be implemented as a sequence of processor-implemented executed steps and as interconnected machine or circuit modules within the mobile device 102. Likewise, the descriptions of various component modules can be provided in terms of operations executed or effected by the modules. The resulting implementation is a matter of choice, dependent on the performance requirements of the underlying system implementing the described technology. Accordingly, the logical operations making up the embodiment of the technology described herein are referred to variously as operations, steps, objects, or modules. It should be understood that logical operations can be performed in any order, unless explicitly claimed otherwise or a specific order is inherently necessitated by the claim language.

Figure 2A:
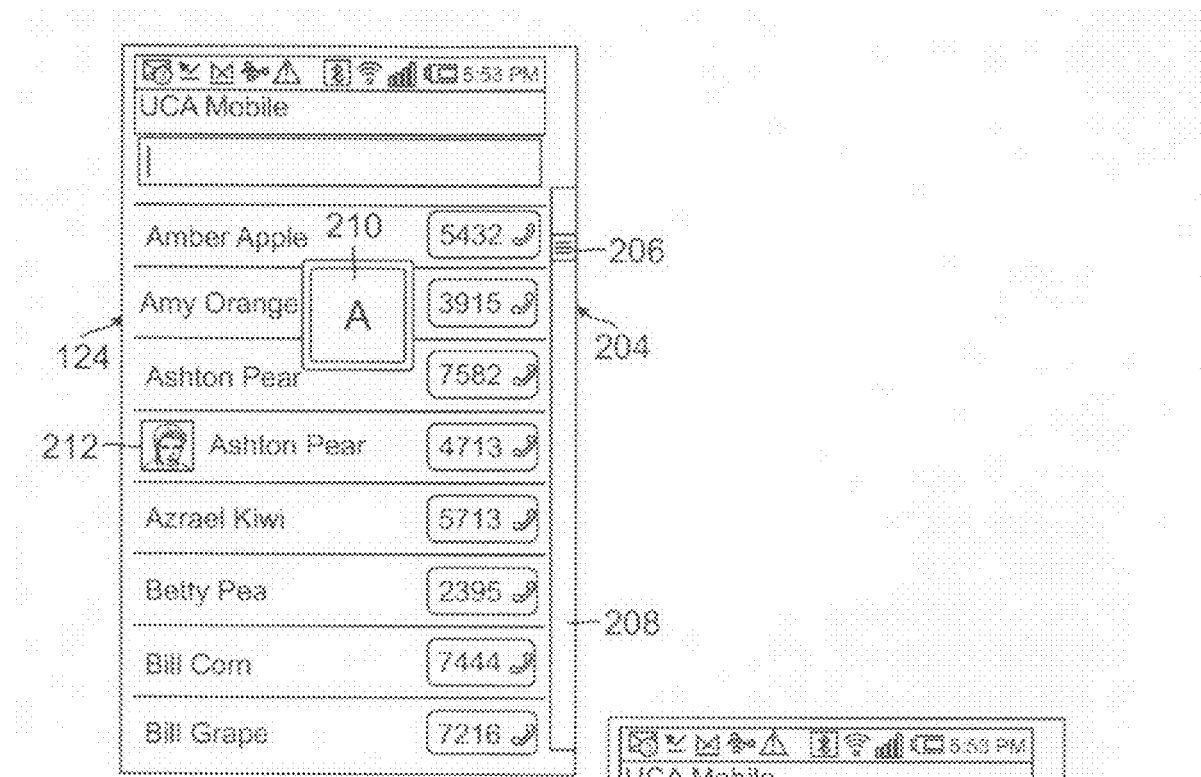
FIG. 2A illustratively depicts an upper portion of an exemplary presentation with a scroll bar having a thumb at the top of the track in accordance with one aspect of the present application.

Described earlier, in one embodiment, the presentation 124 can take the form of a scrolling presentation. As depicted in FIG. 2A, an upper portion of an exemplary presentation 124 with a scroll bar 204 having a thumb 206 at the top of a track 208 in accordance with one aspect of the present application is provided. The presentation 124 can provide a contact list having information about employees within a company directory. The company directory can include numerous entries that can expand many screens or views within the presentation 124. Images 212 for each of the employees can be shown within the presentation 124 along with their extension. When the thumb 206 is at the top of the track 208, contacts starting with the letter "A" 210 can be shown. Current systems require a period of time to retrieve and present the images 212 for each of the employees on the presentation 124, thus not all images 212 have been depicted.

Figure 2B:
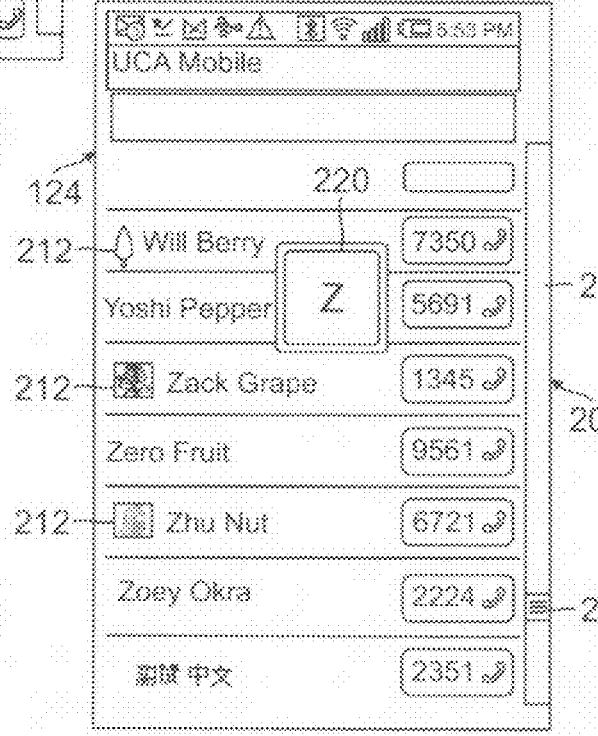
FIG. 2B provides a lower portion of the exemplary presentation with the scroll bar having a thumb at the bottom of the track in accordance with one aspect of the present application.

When the thumb 206 on the scroll bar 204 of the exemplary presentation 202 is switched to the bottom of the track 208, as depicted in FIG. 2B, contacts starting with the letter "Z" 220 can be provided. Sliding the thumb 206 to the bottom portion causes the presentation 126 to go through numerous employee contacts. During this time, the presentation 124 sends data requests for retrieving the images 212 for those contacts.

Figure 3A:
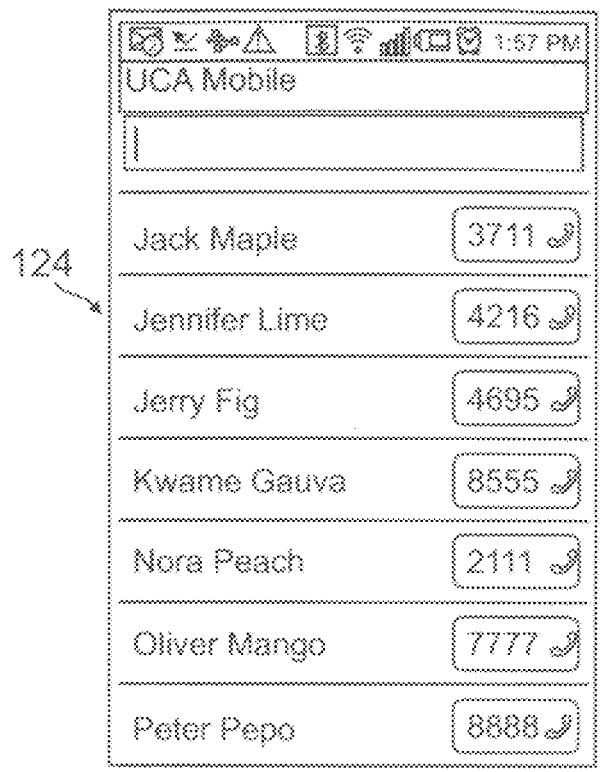
FIG. 3A shows the exemplary presentation having data removed as a result of insufficient memory in accordance with one aspect of the present application.
Figure 3B:
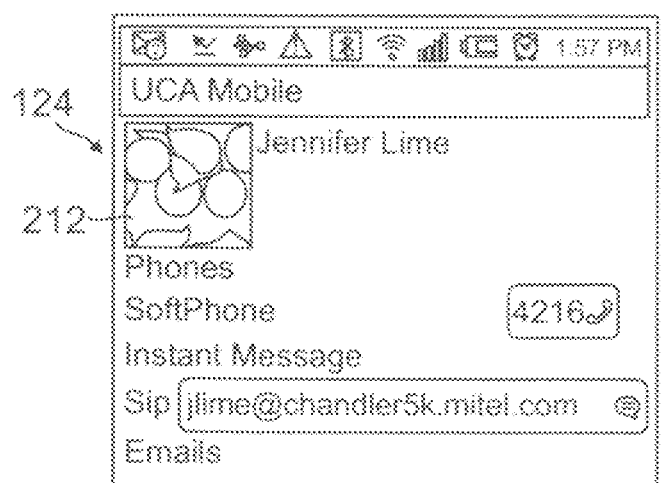
FIG. 3B depicts a single item for display in the exemplary presentation in accordance with one aspect of the present application.

When memory resources are available, as in desktop applications, the mobile presentation 124 could simply cache all the data 212 for the view. When memory resources are scarce, however, the presentation 124 does not show the data 212 at all. FIG. 3A shows the exemplary presentation 124 having data 212 removed in accordance with one aspect of the present application. When the user clicks on a contact within the presentation 124, a single item for display is provided as depicted in FIG. 3B. In current systems, however, the presentation 124, and more specifically the data 212, is not updated quickly enough providing an unpleasant user experience.

To overcome these challenges, and generally working with a system having limited memory 106, fetching and retrieving the data 212 using different techniques as opposed to limiting the user's views are described below.

Figure 4:
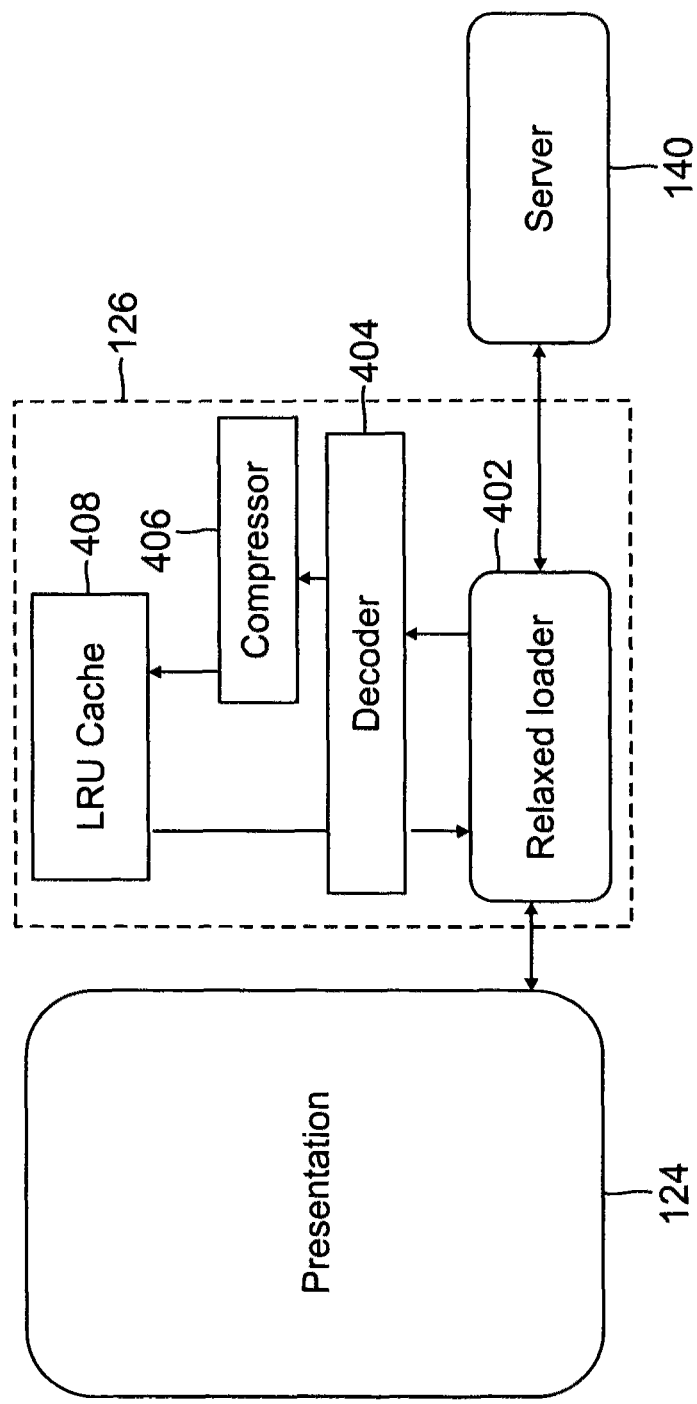
FIG. 4 shows illustrative components of the presentation update application in accordance with one aspect of the present application.

FIG. 4 shows illustrative components of the presentation update application 126 in accordance with one aspect of the present application. In one embodiment, some of the components can reside outside the memory 106. As shown, the presentation 124 can receive data 212 from the server 140 through the presentation update application 126. The components of the presentation update application 126 can include, but are not limited to, a relaxed loader 402, decoder 404, compressor 406 and last recently used (LRU) cache 408, all of which will be described below.

The presentation 124 can be a user interface layer that can provide corporate contacts or typically anything that has listed information. In one embodiment, the presentation 124 can display the scrollbar 204 shown in FIGS. 2A and 2B. Known to those skilled in the relevant art, there are numerous methods for changing the screen of a presentation 124. Each time the screen is changed, altered or manipulated, data requests can be made to the presentation update application 126.

The data requests can be received at the relaxed loader 402 of the presentation update application 126. The relaxed loader 402 can be used to remove the burden placed on the presentation 124 and server 140 for fetching data 212. The relaxed loader 402 can reduce the amount of requests to the server 140 by fetching data 212 only within the current display. Advantageously, this prevents lag time to load data 212 from the server 140.

In one embodiment, the relaxed loader 402 can be implemented using a stack. The stack can have a limited size for storing data requests that are generated by the presentation 124. The stack can be operated in memory 106 and generally has two fundamental operations: push and pop. The push operation can add a data request to the top of the stack. The pop operation can remove a data request from the top of the stack and return the data request to the relaxed loader 402. The stack allows for the last received data request or head to be provided to the server 140. In one embodiment, and in accordance with the limited amount of memory 106 that can be used by the presentation 124, the stack can hold only a limited amount of data requests. When a push operation is used that would increase the size of the stack beyond its limits, the stack can discard requests that were previously provided. The discarded requests would typically be at the bottom of the stack. Well known techniques can be used to discard these requests. Functionally, this would remove outdated requests that are not needed within the current screen of the presentation 124.

After retrieving data requests, the relaxed loader 402 can serialize the requests to the server 140. Generally, the server 140 does not get more than one request from the relaxed loader 402 at a time. Upon a user's fast scroll on a large list, the relaxed loader 402 can be bombarded with thousands of requests from the presentation 124. In one embodiment, the requests can be dropped as the relaxed loader 402 holds a limited size of requests, for example, ten. The relaxed loader 402 can handle requests by selecting the most recent requests pertaining to the user view on the display 108 and then providing them to the server 140.

The data 212 received from the server 140 can be provided to the decoder 404 from the relaxed loader 402. Typically, the data 212 received from the server 140 is not useable by the presentation 124. The decoder 404 can convert the data 212 for the presentation 124. Advantageously, this removes critical tasks by the presentation 124 so that the presentation 124 can be focused on other routines. In one example, data 212 from the server 140 is provided in extensible markup language and cannot be used by the presentation 124. The decoder 404 can convert the data 212 received from the server 140 to processed data. In one example, the server 140 can provide a JPEG image that would be translated to processed data by the decoder 404.

Continuing with FIG. 4, the processed data 212 from the decoder 404 can be provided to the compressor 406. The compressor 406 can be used to reduce the size of the data 212 as needed by the presentation 124 so that the cache 408 does not build up and more entries can be held. The compressor 406 can compress the decoded data 212 based on presentation parameters so the data 212 can be cached efficiently and the presentation 124 has to do less processing when using the data 212. For example, when an image of dimension 120×120 is of size five kilobytes for thirty-two bits is received from the server 140, and the image is going to be shown on a presentation 126 of 40×40 pixels on twenty-four bits, it is efficient to feed the presentation 124 with data 212 that requires no image shrinking or stretching. The compressor 406 can resize the image from the server 140 to 40×40 on twenty-four bits which would roughly take about one tenth of the original size. As a result, the cache 408 can hold multiple images in the allocated memory 106.

The LRU cache 408 can act as a temporary storage for data 212. Generally, the cache 408 is small and stores only a limited amount of information. The cache 408 can process data for multiple entries. For example, in the case of call history, there can be multiple entries from the same person. Instead of the presentation 124 decoding a JPEG image from cache 408 for each entry, the cache 408 can associate processed images for multiple entries. As a result, the presentation 124 typically does not have to decode multiple JPEG images for the presentation 124. The association of cached images to processed images can then be provided to the presentation 124 through the relaxed loader 402 which will be discussed below.

FIG. 5 is a flow chart showing exemplary routines for handling data requests in accordance with one aspect of the present application. Those skilled in the relevant art will appreciate that fewer or more processes can be used and those processes described can be combined with routines from FIG. 6. The processes for updating the presentation 124 can begin at block 500.

At block 502, the presentation update application 126, through the relaxed loader 402, can receive requests for data 212. These requests can be a result of scrolling the presentation 124 using the scrollbar 204. In one embodiment, and in some interfaces, the movement of the presentation 124 can occur through a touch screen display 108 to activate data requests. When the requests are received, the relaxed loader 402 of the presentation update application 126 can determine whether the requested data 212 is within the LRU cache 408 at decision block 504. Recent data 212 can be stored into the LRU cache 408. For purposes of illustration, the data 212 can be found in cache 408 when the user slightly moves the thumb 206 up and down the track 208 repeatedly.

When the data 212 is within the LRU cache 408, the data 212 is pulled directly from the cache 408 and provided to the presentation 124 at block 506. Processes shown within FIG. 8 can be used to handle multiple entries. The data 212 can go through the relaxed loader 402 and then to the presentation 124 where it is updated. The processes can end at block 508.

However, if the data 212 is not within the cache 408, the relaxed loader 402 can add the request to the head of pending requests at block 510. In this way, requests that are more recent are added to the top in anticipation that the user will need that data 212 versus data 212 that is older. Continuing with the stack described above, the data requests can be pushed onto the stack of the relaxed loader 402.

At decision block 512, the presentation update application 126, through the relaxed loader 402 of the mobile device 102, can determine whether there are a number of requests greater than a predetermined number. The predetermined number can relate to how much data can be presented in the presentation 124 at anytime. For example, the predetermined number can be ten for larger screen devices and be seven for smaller view devices. In one embodiment, the user can set the predetermined number so that it can be customized. When the number of requests is greater, at block 514, the presentation update application 126 can clear out old requests from the relaxed loader 402. The processes can end at block 508.

In FIG. 6, a flow chart showing exemplary routines for asynchronously processing pending requests in accordance with one aspect of the present application is provided. Those skilled in the relevant art will appreciate that fewer or more processes can be used. The processes can begin at block 600. At decision block 602, a determination can be made whether there is a pending request. Pending requests can be received in a stack structure that keeps track of the last entered data request. When used, the data request can be taken from the stack and processed. When there is no pending request, at block 604, the presentation update application 126 can wait for requests to arrive.

At block 606, the presentation update application 126 can process the head of the pending requests. As described above, the older the data request, the less likely the presentation 124 will be using the data 212 associated with the data request. In one embodiment, this can be done by performing a pop action in the stack of the relaxed loader 402. When there is a request pending, the LRU cache 408 can be checked at decision block 608. The cache 408 is checked as the data 212 could have been placed in the cache 408 from a different request.

When the data 212 is found in the cache 408, the data 212 from the cache 408 can be updated in the presentation 124 at block 610. Processes shown within FIG. 8 can be used to handle multiple entries. Otherwise, at block 612, the relaxed loader 402 of the presentation update application 126 can asynchronously send the head of pending requests to the server 140. This reduces the load on the communication between the mobile device 102 and the server 140 and provides for a better user experience.

At block 614, the relaxed loader 402 can receive data 212 from the server 140 based on the request. The data 212 can then be decoded at block 616 by decoder 404. By decoding the data 212, it can be properly used by the presentation 124. At block 618, the data 212 can be compressed by compressor 406. In many instances, the data 212 can be reduced in size as the presentation 124 often does not need the total complexities of the data 212.

After compressing the data 212, at block 620, the presentation update application 126 can store the data 212 within the LRU cache 408. The data 212 can then be provided to update the presentation 124 at block 610. Processes shown within FIG. 8 can be used to handle multiple entries. The processes can then transition back to decision block 602 where pending requests are checked.

Some presentations 124 can repeat multiple entries, for example, in a missed call presentation 124 depicted in FIG. 7. As shown, the presentation 124 indicates three missed calls from "Ashton Pear", two missed calls from "Yoshi Pepper" and two missed calls from "Zoey Okra." Along with the name provided by each of the missed calls, data 212 can be provided next to the name such as an image. Each time the data 212 is placed along with the name, the presentation update application 126 can decode the data 212 from cache 408 into processed data and assign a red-green-blue (RGB) color model within the presentation 124. This process, however, is inefficient when there are multiple entries in the amount of processing and memory used.

A presentation 124 having multiple common entries can be more efficiently served using processed data rather than unprocessed data from the cache 408. For example, a user's call history presentation 124 tends to have multiple entries for the same person. In such views, it is more efficient to attach a processed image such as a RGB buffer than a compressed JPG image to the image view area.

FIG. 8 is an illustrative flowchart showing processes for updating data 212 within the presentation in accordance with one aspect of the present application. The processes can begin at block 800. The presentation update application 126 can determine whether the presentation 124 needs processed data 212 at decision block 802. As described above, the presentation 124 could use processed data 212 when multiple entries are provided that have common data 212. Using processed data 212 would be much more efficient than processing the data for each entry on the presentation 124. When processed data 212 is not used, at block 804, the presentation update application 126 can send the cached data to the presentation 124. The data 212 from the cache 408 can be decoded and provided to the presentation 124. The processes can end at block 814.

When the presentation 124 uses processed data 212, at decision block 806, the presentation update application 126 can determine whether processed data 212 is associated with the cached data 212. If there are multiple entries, it is typically more efficient to attach a processed image, such as an RGB buffer, rather than a compressed JPG image to the image view area. When the RGB buffer is used then all the common entries share the same memory and at block 812, the presentation update application 126 can send the presentation 124 the processed data 212 where it can more efficiently use the data 212. The processes can end at block 814. If the JPG image was used for the multiple entries, all of the image view area would have to decode the JPG image into its own RGB buffer internally and assign that RGB buffer to an image view area on the presentation 124, which typically increases processing and memory inefficiencies.

At block 808, and when there is no processed data 212 associated with the cached data 212, the presentation update application 126 can use the cached data 212 to generate processed data 212. The presentation update application 126 can associate the processed data 212 within the cache at block 810. At block 812, the presentation update application 126 can send the presentation 124 the processed data where it can more efficiently use the data 212. Hence, when the view has multiple entries for the same image, then it is better to get a processed image, such as an RGB buffer, from the image cache rather than a JPG image. The processes can end at block 814.

In accordance with one aspect of the present application, a method for providing data within a presentation displayed on a mobile device is provided. The method can include receiving data requests for the presentation. In addition, the method can include asynchronously retrieving data corresponding with the data requests from a server beginning with a last received data request. The method can also include displaying the data within the presentation.

In one embodiment, the method can include converting the data to a useable form for the presentation. In one embodiment, the method can include decoding the data retrieved from the server and compressing the data and storing the data into cache. In one embodiment, the method can include associating the data stored within the cache when multiple common entries are provided in the presentation, processing the data within the cache and providing the processed data to the presentation for display within the multiple common entries.

In one embodiment, asynchronously retrieving the data corresponding with the data requests can include removing data requests that are outdated. In one embodiment, asynchronously retrieving data corresponding with the data requests from the server beginning with the last received data request can include continuously fetching data using data request at a head of pending requests. In one embodiment, the presentation can include a scroll bar that when scrolled provides the data requests. In one embodiment, additional data requests can be received when the scroll bar of the presentation is scrolled anew.

In one embodiment, asynchronously retrieving the data corresponding with the data requests from the server can include determining whether the data is within cache before retrieving data from the server.

In accordance with another aspect of the present application, an apparatus is provided. The apparatus can include at least one processor and a memory operatively coupled to the processor, the memory storing program instructions that when executed by the processor, causes the processor to perform processes. The processes can include displaying a user interface and receiving at least one data request corresponding to data placed within the user interface. In addition, the processes can include retrieving the data corresponding to the at least one data request from cache when the data is found within the cache, otherwise, retrieving the data from a network by placing the at least one data request within pending requests and fetching the data from the network starting with a last added data request within the pending requests. The processes can also include displaying the data within the user interface.

In one embodiment, the memory storing program instructions when executed by the processor causes the processor to decode the data fetched from the network, compress the data, store the data within the cache, associate the data within the cache, and process the data for display on the user interface. In one embodiment, the memory storing program instructions when executed by the processor causing the processor to associate the data within the cache can include linking multiple entries on the user interface with the associated data.

In one embodiment, the memory storing program instructions when executed by the processor can cause the processor to remove data requests from the pending requests when a predefined number of requests are met. In one embodiment, fetching the data from the network can include serializing the pending requests to the network one at a time.

In accordance with yet another aspect of the present application, a system is provided. The system can include a mobile phone having an interface containing images retrieved from a server. The mobile phone can fetch the images by serializing image requests to the server beginning with a most recent image request. The fetched images can be decoded, compressed and placed into cache on the mobile phone. The mobile phone can associate the images in the cache and processing the images from the cache for multiple entries on the interface.

In one embodiment, the mobile phone can remove older image requests. In one embodiment, the interface can display at least one of contacts, calls history and messages. In one embodiment, the mobile phone can place the image requests onto a stack. In one embodiment, the images can be associated with one another when the images correspond to a single entity. In one embodiment, single entity can be a user profile.

The foregoing description is provided to enable any person skilled in the relevant art to practice the various embodiments described herein. Various modifications to these embodiments will be readily apparent to those skilled in the relevant art, and generic principles defined herein can be applied to other embodiments. Thus, the claims are not intended to be limited to the embodiments shown and described herein, but are to be accorded the full scope consistent with the language of the claims, wherein reference to an element in the singular is not intended to mean "one and only one" unless specifically stated, but rather "one or more." All structural and functional equivalents to the elements of the various embodiments described throughout this disclosure that are known or later come to be known to those of ordinary skill in the relevant art are expressly incorporated herein by reference and intended to be encompassed by the claims. Moreover, nothing disclosed herein is intended to be dedicated to the public regardless of whether such disclosure is explicitly recited in the claims.

What is claimed is:

1. A method for providing data within a presentation displayed on a mobile device comprising:

receiving data requests, at a relaxed loader of said mobile device, for said presentation, said relaxed loader comprising a stack for storing said data requests;

retrieving data corresponding to at least one data request from a cache of said mobile device when said data is found within said cache, otherwise said relaxed loader serializing said data requests to a server from said stack and asynchronously retrieving data corresponding to said data requests from said server;

converting, at said mobile device, said data retrieved from said server to a useable form for said presentation;

storing said data retrieved from said server in said cache; and displaying said data within said presentation.

2. The method of claim 1, comprising:

decoding said data retrieved from said server; and compressing said data.

3. The method of claim 2, comprising:

associating said data stored within said cache when multiple common entries are provided in said presentation;

processing said data within said cache; and providing said processed data to said presentation for display within said multiple common entries.

4. The method of claim 1, wherein asynchronously retrieving said data corresponding with said data requests comprises removing data requests that are outdated.

5. The method of claim 1, wherein asynchronously retrieving data corresponding with said data requests from said server beginning with said last received data request comprises continuously fetching data using data request at a head of pending requests.

6. The method of claim 1, wherein said presentation comprises a scroll bar that when scrolled provides said data requests.

7. The method of claim 6, comprising receiving additional data requests when said scroll bar of said presentation is scrolled anew.

8. The method of claim 1, wherein asynchronously retrieving said data corresponding with said data requests from said server comprises determining whether said data is within cache before retrieving data from said server.

9. An apparatus comprising:

at least one processor, and a memory operatively coupled to said processor, said memory storing program instructions that when executed by said processor, causes said processor to:

display a user interface;

receive, at a relaxed loader, at least one data request corresponding to data placed within said user interface, said relaxed loader comprising a stack for storing said data requests;

retrieve said data corresponding to said at least one data request from cache when said data is found within said cache, otherwise, said relaxed loader serializes said at least one data request to a server from said stack and retrieve said data from a network by placing said at least one data request within pending requests and fetching said data from said network starting with a last added data request within said pending requests;

convert said data retrieved from said server to a useable form for said presentation;

store said data retrieved from said server in cache; and display said data within said user interface.

10. The apparatus of claim 9, wherein said memory storing program instructions when executed by said processor causes said processor to:

decode said data fetched from said network;

compress said data;

associate said data within said cache; and process said data for display on said user interface.

11. The apparatus of claim 10, wherein said memory storing program instructions when executed by said processor causing said processor to associate said data within said cache comprises linking multiple entries on said user interface with said associated data.

12. The apparatus of claim 9, wherein said memory storing program instructions when executed by said processor causes said processor to remove data requests from said pending requests when a predefined number of requests are met.

* * * * *